United States Patent
Wilkie et al.

(10) Patent No.: US 7,475,237 B2
(45) Date of Patent: Jan. 6, 2009

(54) TIMER WITH PERIODIC CHANNEL SERVICE

(75) Inventors: Brian F. Wilkie, Austin, TX (US); Michael F. Wiles, Round Rock, TX (US); Jay David Quirk, Kanata (CA)

(73) Assignee: Applied Micro Circuits Corporation, San Diego, CA (US)

( * ) Notice: Subject to any disclaimer, the term of this patent is extended or adjusted under 35 U.S.C. 154(b) by 493 days.

(21) Appl. No.: 11/402,750

(22) Filed: Apr. 12, 2006

(65) Prior Publication Data

US 2007/0245166 A1    Oct. 18, 2007

(51) Int. Cl.
  *G06F 1/00*    (2006.01)
(52) U.S. Cl. .................... 713/2; 713/1; 713/500; 713/502
(58) Field of Classification Search ............ 713/1, 713/2, 500, 502
  See application file for complete search history.

(56) References Cited

U.S. PATENT DOCUMENTS 5,535,376 A    7/1996    Catherwood et al. ........ 395/550

2003/0223481 A1*    12/2003    Jones et al. ............... 375/222
2006/0133406 A1*    6/2006    Homer et al. ............. 370/442

OTHER PUBLICATIONS

FreeScale manual cover page (with link to entire document—40 pages).
Renesas manual cover page (with link to company site—700+ pages).

* cited by examiner

*Primary Examiner*—Abdelmoniem Elamin
(74) *Attorney, Agent, or Firm*—Law Office of Gerald Maliszewski; Gerald Maliszewski

(57) ABSTRACT

A system and method are provided for periodically servicing a channel in a timer used for controlling events. The method services a channel in a fixed periodic cycle, and reads a first control word loaded in the channel to determine a timer operation. Then, a first data word in the channel is managed in response to the determined operation. In one aspect, a clock signal is supplied with a fixed period. Then, servicing the channel in a fixed periodic cycle includes: establishing a cycle having a first number of clock signals; and, servicing the channel for a second number of clock signals each cycle. If the timer includes a plurality of channels, then each channel is serially serviced in a single cycle.

20 Claims, 5 Drawing Sheets

TIMER WITH PERIODIC CHANNEL SERVICE

BACKGROUND OF THE INVENTION

1. Field of the Invention

This invention generally relates to an electrical programmable event timer and, more particularly, to a timer capable of servicing timer channels with a fixed interval periodicity.

2. Description of the Related Art

Programmable timers are widely used in the data processing and machine control fields. Some of the common tasks performed by most timers include input capture and output compare. An input capture function records ("captures") the time at which an external event (electrical signal) occurs. For example, input capture may be used to read a limit switch or a temperature. An output compare function generates an output signal in response to programmed time intervals. For example, output compare can be used to run an electrical motor or solenoid. Input capture and output compare functions can be modified in response to commands from an associated programmable logic controller (PLC), programmable controller (PC), or microprocessor, and they may also be used to trigger interrupts in the PC program.

From these relatively simple functions, more complex operations such as pulse width modulation (PWM) can be performed using multiple cooperating channels, to operate a motor for example. A predetermined pulse width can be represented as a digital value, stored in a first timer channel register, and used to perform the pulse width modulation function. A second timer channel register can be used to store a first period value—the period of the pulse width. Likewise, a third timer channel register can be used to store a second (shorter) period value, which can be used to make the pulse width narrower, if feedback signals dictate that such an action is necessary.

The use of such dedicated circuitry insures that pulses are generated with the necessary pulse width, with a minimum of latency, if the pulse width must be made longer or shorter. In addition to the use of the above-mentioned master registers, each channel conventionally must further include an additional slave channel that is loaded with data to be used in a subsequent timer operation. While this system is simple to implement, it uses significant hardware resources. Further, the system induces latency with memory access and the shuffling of data between multiple stages of buffering.

A timer can perform at greater number of operations, more smoothly, with the assistance of an associated microprocessor. Using the master and slave registers presented above, the timer uses simple state logic to load the next data word from the slave register into the master register for a two-step operation, when the timed events are responding "normally". However, in the event of an abnormal situation, the microprocessor can directly load a word into the master register, from memory, that is more appropriate for the situation. For the sake of increased flexibility, some timer designs have opted to have all channel service operations performed in response to execution of microprocessor/software instructions. While the use of the microprocessor adds flexible, it does so at the cost of system resources. Generally, the microprocessor is responsible for other functions besides servicing the timer channels. Further, the latency associated with microprocessors and software instructions is much greater than hardware logic operations. Even more critical, the cost of designing the software to run a microprocessor-based timer can be very high. If there are a large number of timers to be programmed, for use in a production line for example, the average cost of the timer may be tolerable. But for custom control systems, the cost of a microprocessor-based timer may be prohibitive.

It would be advantageous if a programmable timer channel could be designed to function with a single register, in conjunction with data and control instructions stored in random access memory (RAM).

It would be advantageous if a timer channel could be updated automatically with data words, without the intervention of microprocessor-driven software instructions.

SUMMARY OF THE INVENTION

The present invention timer includes several features that have not been previously available. First, the channels only require one simple register. Conventionally, a master register and a slave register are required. The channels share a time base counter. Additional control information about the channel functions is saved in RAM, which provides a more efficient means of storage than a channel with multiple registers.

The channel hardware watches for matches between the time base and the channel data word, and then generates an output signal based on the pin control. The channel may also generate an interrupt request automatically when the channels need updating. The timer stores automatic update modes and signals in the local RAM. These modes provide direction for the functions to be performed, when to update the channels, and when to interrupt the processor.

Accordingly, a method is provided for periodically servicing a channel in a timer used for controlling events. The method services a channel in a fixed periodic cycle, and reads a first control word loaded in the channel to determine a timer operation. Then, a first data word in the channel is managed in response to the determined operation. In one aspect, a clock signal is supplied with a fixed period. Then, servicing the channel in a fixed periodic cycle includes: establishing a cycle having a first number of clock signals; and, servicing the channel for a second number of clock signals each cycle. If the timer includes a plurality of channels, then each channel is serially serviced in a single cycle.

With respect to an input capture function, the method supplies a time base counter value. Managing the first data word in the channel includes: detecting a signal on an external interface; and, loading the counter value into the channel, in response to the detected signal. Then, servicing the channel in a fixed periodic cycle includes storing the loaded value as the first data word in RAM. In one aspect, the first data word and the first control word are stored in sequential addresses in RAM.

With respect to the output compare function, servicing the channel in a fixed periodic cycle includes loading the first control word and the first data word into the channel from RAM. Managing the data word in the channel includes: comparing the first data word to the counter value; and, in response to a match, supplying an output signal to an external interface. In a subsequent cycle, RAM is accessed and a second control word and a corresponding second data word are loaded into the channel. The second control word is read to determine an operation, and the second data word is managed in response to the determined operation.

Additional details of the above-described method and a timer for controlling events with periodic channel service are presented below.

DETAILED DESCRIPTION

Figure 1:
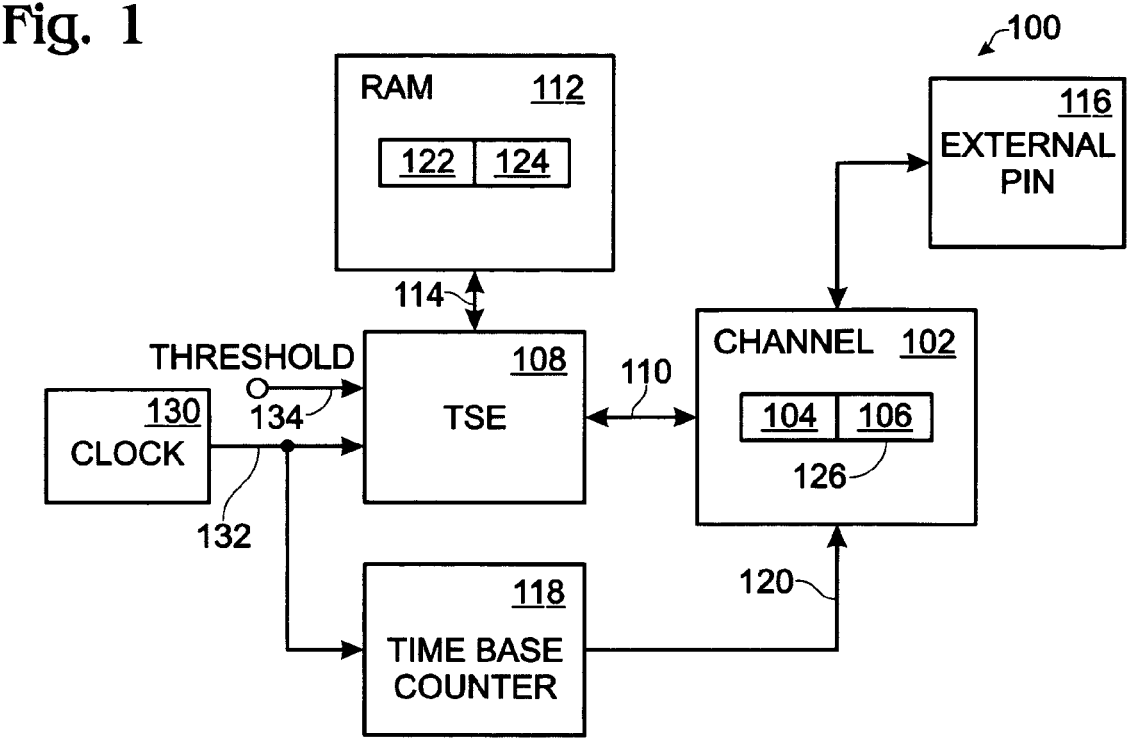
FIG. 1 is a schematic block diagram of a timer for controlling events with periodic channel service.

FIG. 1 is a schematic block diagram of a timer for controlling events with periodic channel service. The timer 100 comprises a channel 102 for monitoring a loaded control word and a loaded data word. The channel 102 reads a first control word 104 to determine an operation, and manages a first data word 106 in response to the determined operation. A timer service engine (TSE) 108 has an interface on line 110 for servicing the channel 102 with control words and corresponding data words in a fixed periodic cycle.

An internal random access memory (RAM) 112 has an interface connected to the TSE 108 on line 114. For example, in one aspect lines 110 and 114 may be a data/address bus. An external interface pin 116 is connected to the channel 102. As described in more detail below, a pin logic module (not shown) may operate independent of the channel to detect pulse edges and to trigger the channel. For simplicity, the pin logic function is assumed to be part of the channel 102. A time base counter 118 has an interface connected to the channel on line 120 to supply a counter value. When the first control word 104 indicates that an input capture function is to be performed, the channel 102 detects a signal on the external interface pin 116 and loads the counter value into the channel in response to the detected signal. Then, the TSE 108 stores the loaded value from the channel into RAM 112 as the first data word. In one aspect, the TSE 108 stores the first data word 106 and the first control word 104 as sequential addresses in RAM.

In another aspect, the TSE 108 accesses the first control word and first data word from RAM 112, and loads the words into the channel 102. If the control word indicates that an output compare function is to be performed, then the channel 102 compares the first data 106 word to the counter value, and in response to a match, supplies an output signal to the external interface pin 116. After the channel completes the management of the first data word, the TSE 108 accesses the RAM 112 in a subsequent cycle, and loads a second control word 122 and a second data word 124 into the channel 102. Then, the channel 102 monitors the loaded control and data word. For example, the channel 102 reads the second control word 122 and manages the second data word 124.

In one aspect, the channel 102 consists of a single register 126. For example, register 126 may be a 32-bit register that holds a 24-bit data word and an 8-bit control. However, the register 126 is not limited to any number of total bits, control words bits, data word bits, or any particular relationship between the number of control and data bits. In another aspect, the TSE 108 accesses RAM 112, locates the second control 122 word and second data word 124 in sequential addresses, and loads the second control word and second data word into the (single-register) channel.

The timer 100 also comprises a clock 130 having an interface on line 132 to supply clock signals with a fixed period. The TSE 108 has an interface on line 132 to receive the clock signal. The TSE 108 establishes a cycle having a first number of clock signals and services the channel for a second number of clock signals each cycle. In the simple example shown, the timer 100 is comprised of a single channel 102. In this example, the first number of clock signals may equal the second number of clock signals. That is, a cycle may consist of a second number of clock signals, which are all devoted to servicing the channel.

Figure 2:
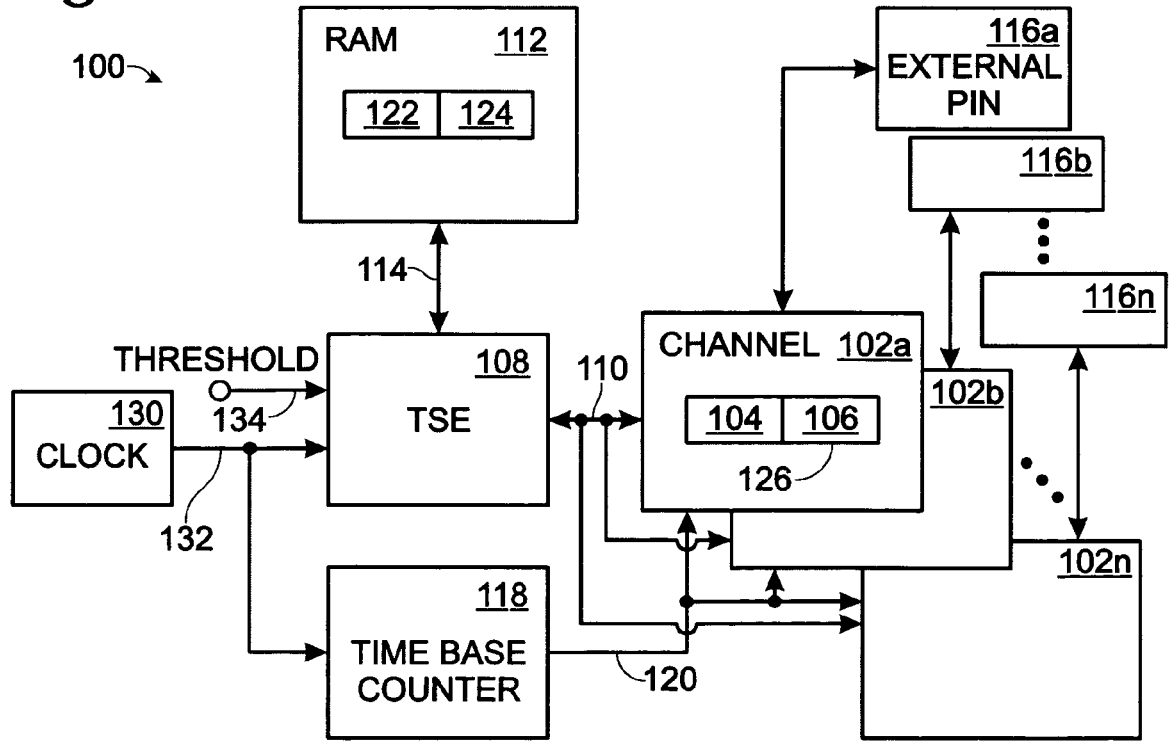
FIG. 2 is a schematic block diagram depicting a variation of the timer of FIG. 1.

FIG. 2 is a schematic block diagram depicting a variation of the timer of FIG. 1. In this example, the timer 100 is comprised of a plurality of channels 102a through 102n, each with loaded control and data words, and each having an interface connected to the TSE 108 on line 110. The value of n is not limited to any particular value. Likewise, each channel 102a-120n may be associated with a separate external interface pin 116a-116n, respectively. Here, the TSE 108 serially services each channel in a single cycle, while each channel continuously manages data words, independent of the operations and the cycle established by the TSE. For example, if n=15 and TSE services each channel for four clock signals, then a cycle is made up of 60 (15×4) clock signals. To continue the example, the TSE may check a channel in a first clock signal to determine the service to be performed. The TSE may read from RAM in the second clock signal and write to the channel in a third clock signal. Alternately, the TSE 108 may read from the channel in the second clock signal and write to RAM in the third clock signal. In the event that the fourth clock signal is not needed to service the channel, the TSE may permit a microprocessor (not shown) to access RAM 112.

Referencing either FIG. 1 or 2, in an auto load aspect the TSE 108 counts the number of clock signals, compares the clock signal count to a threshold value on line 134, and automatically services channel 102 in response to the clock signal count reaching the threshold value.

Although only input capture and output compare functions have been described in any kind of detail, the channel 102 may read the first control word to determine other types of operation such as count up, count down, and pulse width modulation (PWM) functions. These and other channel operations are described in greater detail below. Although FIGS. 1 and 2 show a single time base counter 118, in other aspects described in more detail below, each channel may receive input from multiple time base counters (not shown).

FUNCTIONAL DESCRIPTION

The timer of FIGS. 1 and 2 can be configured to support the following functions: PWM functions with non-overlap times; space vector PWM functions with non-overlap times; programmable dead times; external "Fault" pin to disable outputs; input capture function; output compare function; up counters with modulus; down counters with modulus; quadrature counter with compare function; and, pulse period measurements. In one aspect, the timer is configured with 15 timer channels and two time bases.

Figure 3:
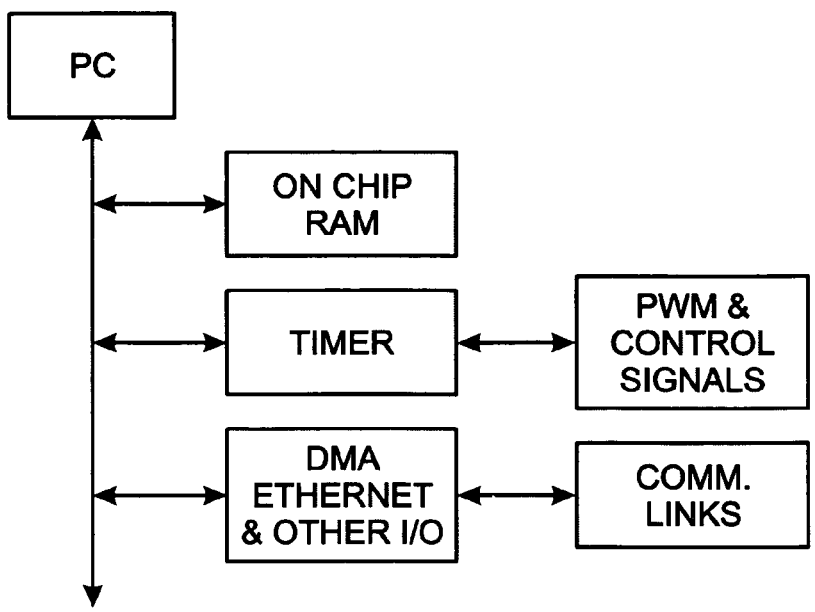
FIG. 3 is a schematic block diagram depicting the timer as a peripheral device attached to a microprocessor or programmable controller (PC).

FIG. 3 is a schematic block diagram depicting the timer as a peripheral device attached to a microprocessor or programmable controller (PC). The timer is interfaced to the PC by writing and reading the timer control registers, timer RAM, and timer channels. Once the timer channels and RAM are initialized, the timer functions run independently, generating output signals or measuring input signals. When a channel needs service from the PC, an interrupt is generated. The amount of data that is collected before the channel generates an interrupt is programmable. The channels connect to the outside world via pins on chip. Each channel has a pin associated with it. Each channel can either generate output signals or receive input signals.

Figure 4:
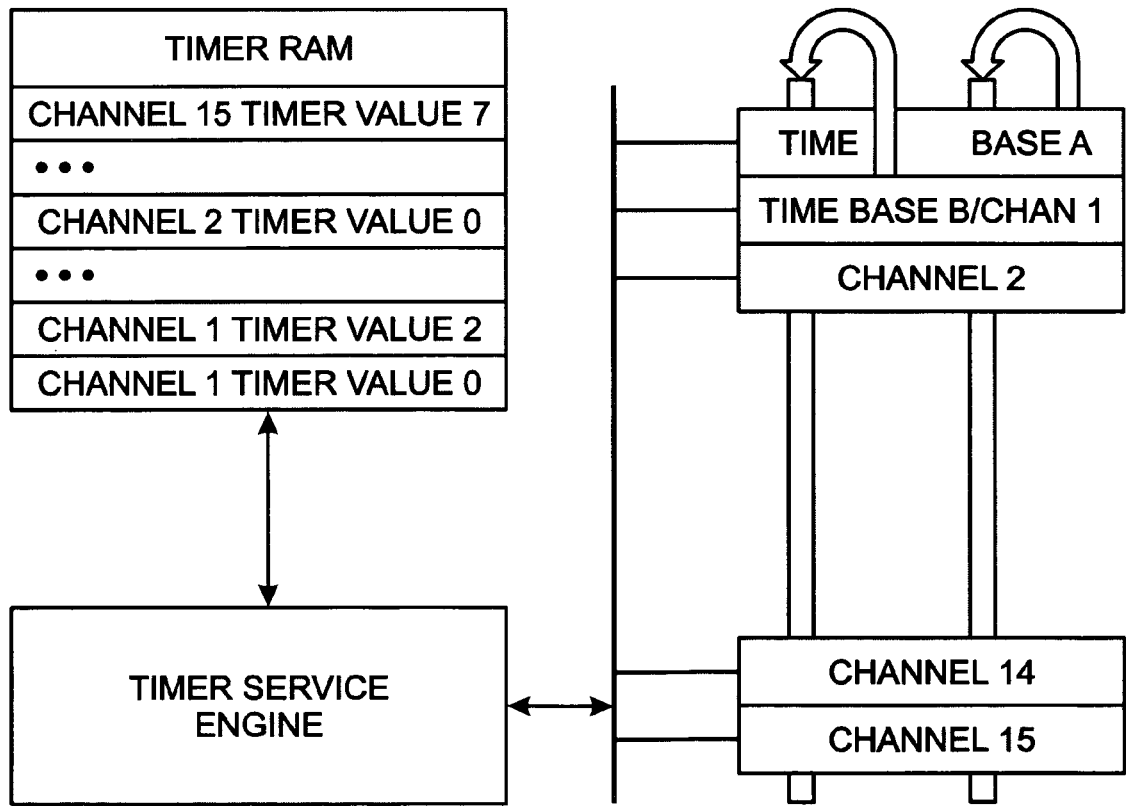
FIG. 4 is a schematic diagram emphasizing the relationship between the TSE, RAM, and the timer channels.

FIG. 4 is a schematic diagram emphasizing the relationship between the TSE, RAM, and the timer channels. The TSE controls and interfaces to the local RAM, which can be configured as one hundred and twenty 36-bit words in one aspect of the timer, and fifteen timer channels in another aspect, each channel consists of a register that can be used for either input capture or output compare. The timer interfaces with the peripheral bus to communicate to the PC.

Figure 5:
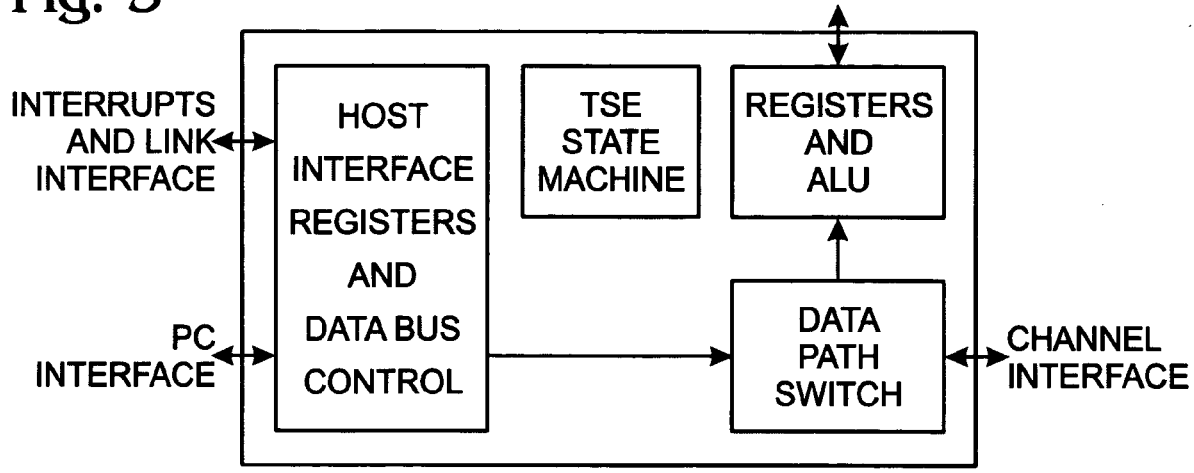
FIG. 5 is a schematic block diagram depicting the TSE in greater detail.

FIG. 5 is a schematic block diagram depicting the TSE in greater detail. The TSE provides the host interface to the PC and memory over the peripheral bus. This interface performs control and data line handshaking, along with requesting and acknowledging interrupts. The TSE acts as a state machine to control the timing and access to the RAM and timer channels. The TSE registers and arithmetic logic unit (ALU) permit the TSE to increment, decrement, and compare data. The data path switch controls the flow of data from the host interface, RAM, channels, and ALU, depending on the timer function being performed. TSE also manages interrupt requests to the PC.

More specifically, the TSE host interface provides the general registers and control for the TSE including interrupts requests. These registers provide control of the general functions of the timer. The control register located in the host interface controls which channels are active in the TSE. It also controls basic operations like RUN, Freeze, and single step modes for the timer. A software reset bit is also available. The host interface also controls which channels are active and which channels may generate an interrupt. Two levels of interrupts are available: low priority and high priority. The high priority is asserted only when and emergency condition has occurred that requires immediate attention from PC processor.

The TSE state machine controls the various tasks performed by the timer and it's interactions with the timer channels. In one aspect, the TSE state machine is designed so that all tasks are completed within four clocks, ensuring that timer actions are deterministic. States where the TSE is not active can be released for PC access to the RAM or timer channels. The TSE may use a Round Robin, or other priority scheme as it services the channels. Each channel is serviced in order, each taking four clocks. The worst-case latency is 0.48 microseconds with the TSE running with a 133 MHz clock and having 15 channels to service.

The TSE ALU logic is based on the timer function requirements and the need to perform these functions with each channel. The TSE ALU logic performs increment, decrement, compare, and add.

The TSE data path interfaces the Peripheral Bus to the TSE host control registers, the RAM, and the timer channels. The TSE has priority over the PC for access to the RAM, therefore, some PC access to the timer resources can delayed a few cycles.

Figure 6:
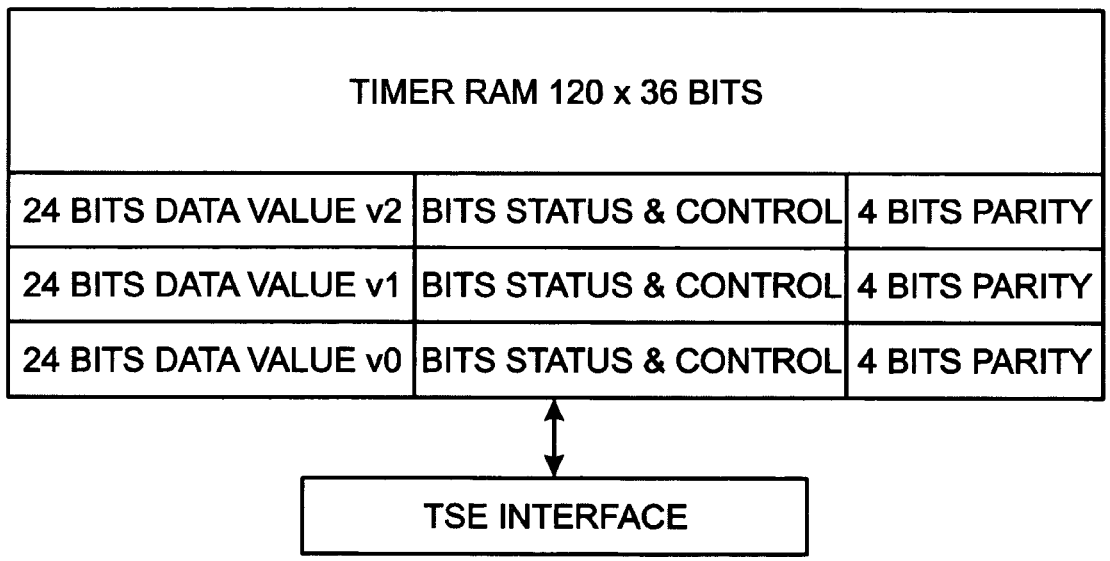
FIG. 6 is a schematic block diagram depicting the timer RAM in greater detail.

FIG. 6 is a schematic block diagram depicting the timer RAM in greater detail. In one aspect, the RAM is configured as 120×36-bit words. One 36-bit word is read at a time. RAM is connected directly to the TSE to supply data and status. The RAM is memory mapped so that the RAM can be accessed by the PC through the TSE. Assuming 15 channels, each channel has eight locations reserved in the RAM to store data and status. The RAM may include one parity bit for each 8 bits. The RAM generates parity each time a word is written, and check parity each time a read occurs. Parity errors are reported in the TSE control register.

Figure 7:
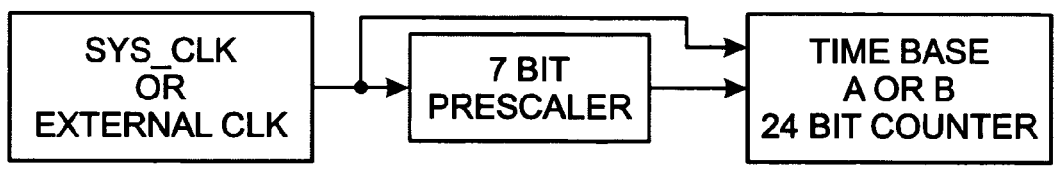
FIG. 7 is a schematic block diagram depicting details of the time bases.

FIG. 7 is a schematic block diagram depicting details of the time bases. Time base A & B can be configured as free-running 24-bit up/down counters. Time base A & B are available to all channels for various functions. When the time base count reaches FFFFFF and rolls over to 000000, it can set the overflow flag and begin counting up again. The overflow flag can be cleared by the processor (PC). The time base may also be used for generating center aligned PWM output pulses or edge aligned PWM pulses. In the center aligned PWM case, the time base counts up to a modulus value, reverses direction, and counts down to zero. When it reaches zero, it reverse again and counts up to the modulus.

The time bases may be driven by an external clock or an internal clock (SYS_CLK). A seven bit prescaler is also available for each time base. Each time base has a modulus register associated with it that can be used to set the maximum count for the time base. When the counter reaches the modulus it rolls over to zero when in the up counting mode. The time base can also be setup to count up and down. In the up/down mode, when the counter reaches the modulus, the counter reverses and starts counting down to zero.

Figure 8:
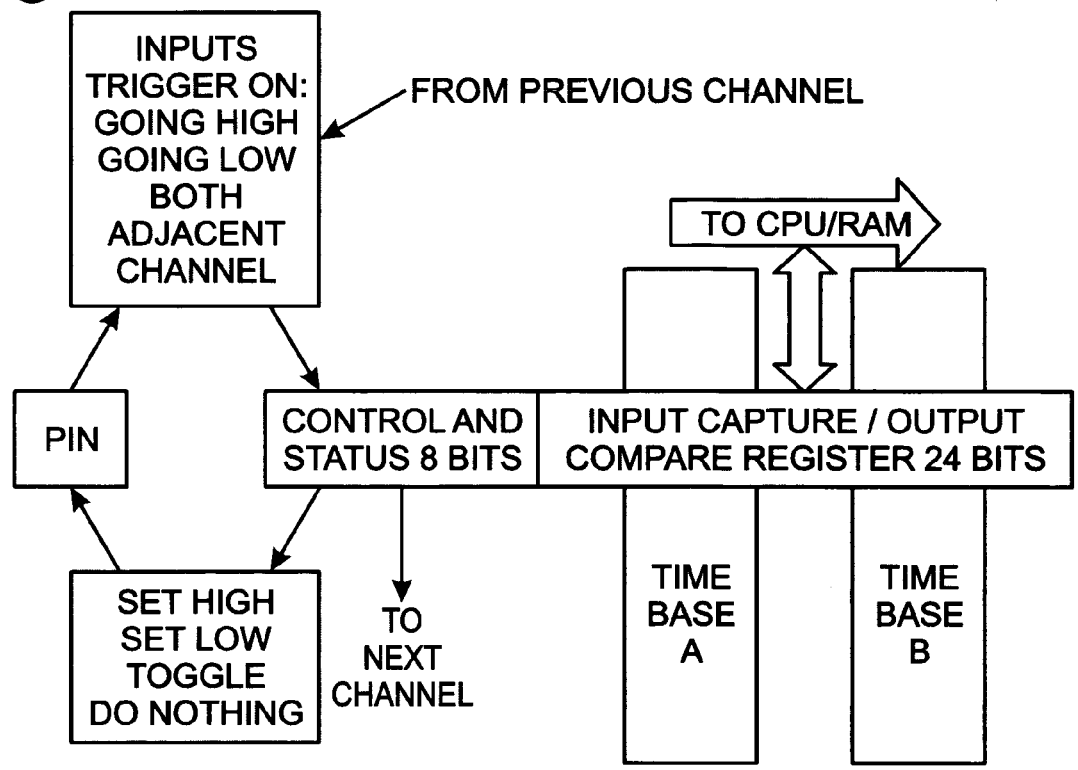
FIG. 8 is a schematic block diagram depicting the channels in greater detail.

FIG. 8 is a schematic block diagram depicting the channels in greater detail. An exemplary timer is configured with 15 channels. Channels may by used for various input capture and output compare functions. In this aspect, the channels are serviced by the TSE approximately once every 0.5 microsecond, and each channel has one 32-bit register. The register is broken down into 8 control and status bits, and 24 data bits. In addition, each channel has a pin that is connected to the channel through the pin control logic. Each channel has the ability to monitor either Time Base A or B. Each channel is also connected to the RAM and TSE. This configuration permits the TSE to update channels with information from the RAM. Captured data on input captures from the channels may be saved in the RAM.

The operation of the timer starts with initialization of the channels and RAM by the PC. Each channel to be used is first initialized to the starting state. The RAM for that channel is setup including auto modes. Once the channels and RAM are ready, the TSE is enabled and the timer operations begin.

In this example, each channel is serviced by the TSE in a Round Robin fashion starting with Channel 1. Next, Channel 2 is serviced and so on until all the channels have been serviced. Each channel takes 4 clocks to be serviced. During this time the TSE determines what needs to be done with the channel based on the 8 control and status bits. The TSE then updates the channel and copies the data and control to or from the TSE RAM.

Updates to the RAM occur as a result of input captures triggered by edge transitions on timer pins. The current time base count is captured at the channel and then copied by the TSE into the RAM for that channel. Some status and control bits are also provided in the RAM to help the user manage the RAM usage.

Input Capture & Period Measurement

Figure 9:
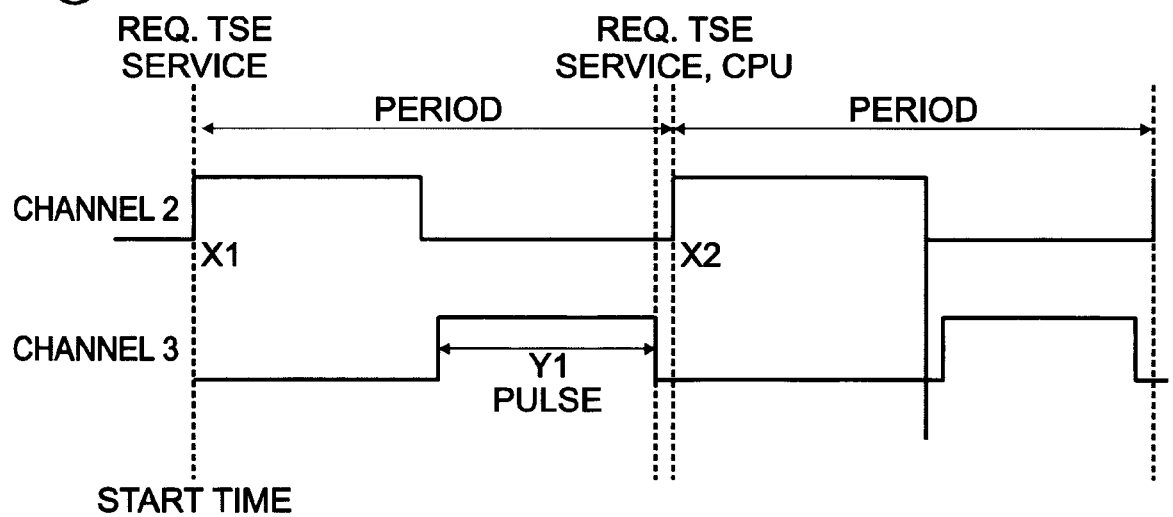
FIG. 9 is a diagram graphically illustrating the measurement of a time period.

FIG. 9 is a diagram graphically illustrating the measurement of a time period. Period measurement is accomplished by using the input capture function. The channel captures, in response to the selected edge of the input signal, the current count of the selected time base into the input capture register. The TSE then recognizes that an edge has occurred and copies the register into the RAM at Value_0. The channel register is then ready for the next edge. When the next edge occurs, the time base is again captured into the channel register. The TSE then recognizes that an edge has occurred and copies the register into RAM at Value_1. The TSE now requests service from PC depending on the control bit settings in the RAM. The PC may now calculate the period of the input pulse by subtracting the first value from the second.

At Start Time, both Channel 2 and Channel 3 are low. Channel 2 is used to measure the period of the pulse, while Channel 3 is used to measure the pulse width of the pulse. Channel 2 is setup to trigger the input capture (IC) into the channel register on the rising edge of the pulse. Channel 2 captures the first edge at X1 and copies the value from the time base into the register. The TSE detects that there has been an edge event and copies X1 to RAM. At X2 another rising edge occurs and is captured into the register. TSE service is requested and X2 is stored into RAM. The TSE checks the IRQR bit in RAM, and if it is set, requests an interrupt from the PC to transfer the data values. The PC can now calculate the period of the pulse by subtraction of the two time base values captured.

For a pulse width measurement Y1 (Channel 3), the setup and steps are similar to the previously-explained channel operation, except that the pin logic is set to detect either edge. When two edges are detected, there are two corresponding time base values. The TSE generates an interrupt and the PC reads the time base values that were captured and stored into RAM, and calculates the difference to obtain the pulse width Y1.

Figure 10:
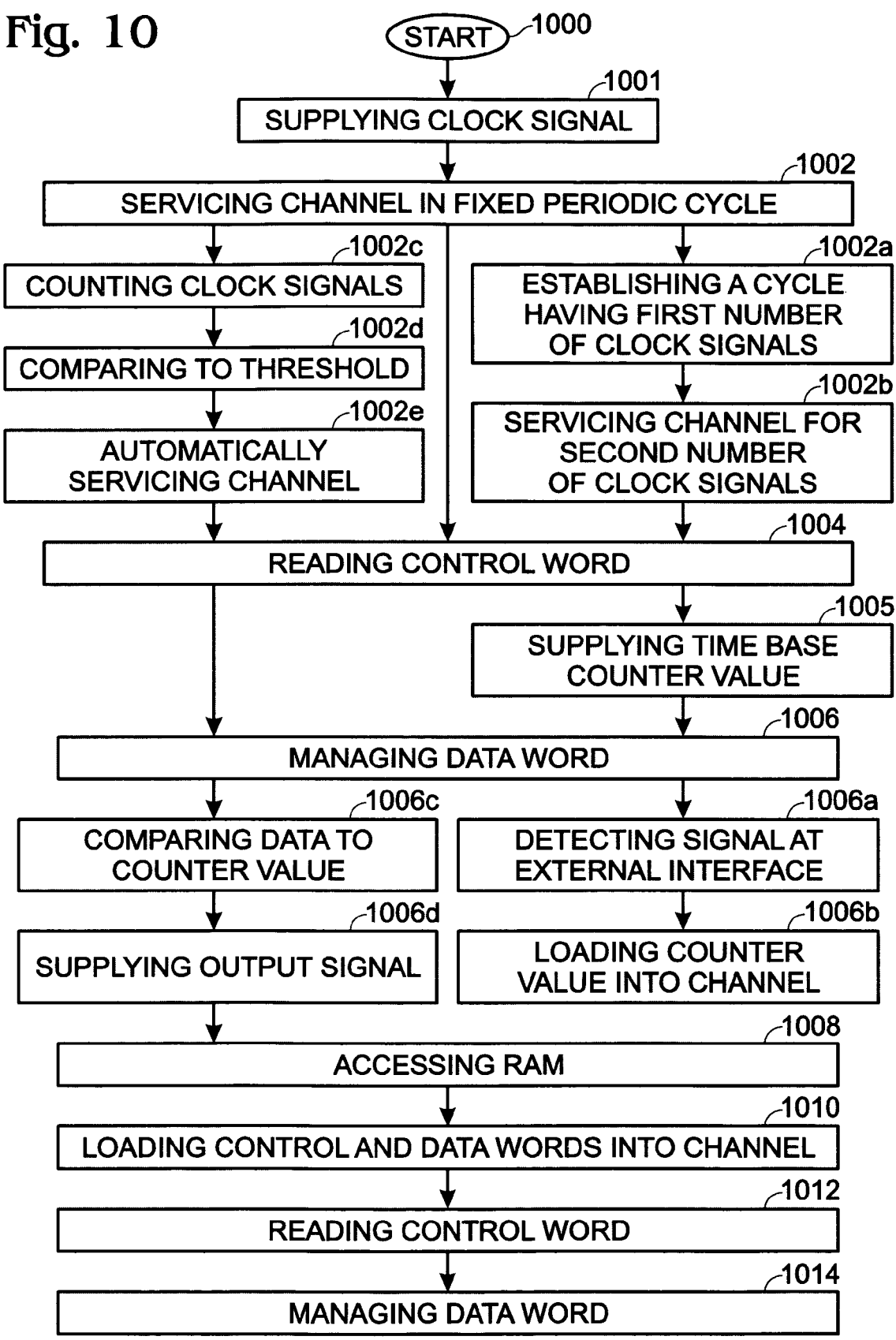
FIG. 10 is a flowchart illustrating a method for periodically servicing a channel, in a timer that is used for controlling events.

FIG. 10 is a flowchart illustrating a method for periodically servicing a channel, in a timer that is used for controlling events. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1000.

Step 1002 services a channel in a fixed periodic cycle. Step 1004 reads a first control word loaded in the channel to determine a timer operation. Some examples of timer operations include input capture, output compare, count up, count down, and pulse width modulation (PWM). Step 1006 manages a first data word in the channel in response to the determined operation.

In an input capture aspect, Step 1005 supplies a time base counter value. Managing the first data word in the channel includes substeps. Step 1006a detects a signal on an external interface, and Step 1006b loads the counter value into the channel, in response to the detected signal. Then, servicing the channel in a fixed periodic cycle (Step 1002) includes storing the loaded value as the first data word in internal random access memory (RAM). In this aspect, Step 1002 occurs after Step 1006. In one aspect, storing the loaded value as the first data word in RAM includes storing the first data word and the first control word in sequential addresses in RAM.

In an output compare aspect of the method, servicing the channel in a fixed periodic cycle (Step 1002) includes loading the first control word and the first data word into the channel from RAM. Then, managing the data word in the channel includes alternate substeps. Step 1006c compares the first data word to the counter value, and Step 1006d supplies an output signal to an external interface, in response to a match (Step 1006c).

In a subsequent cycle, Step 1008 accesses RAM. For example, Step 1008 may locate the second control word and second data word in sequential addresses in RAM. Step 1010 loads a second control word and a corresponding second data word into the channel. Step 1012 reads the second control word to determine an operation, and Step 1014 manages the second data word in response to the determined operation. In one aspect, loading the second control and second data word into the channel (Step 1010) includes loading the second control and second data words into a single register.

In another aspect, Step 1001 supplies a clock signal with a fixed period. Then, servicing the channel in a fixed periodic cycle (Step 1002) includes substeps. Step 1002a establishes a cycle having a first number of clock signals. Step 1002b services the channel for a second number of clock signals each cycle. If Step 1002 includes interacting with a plurality of channels, then each channel is serially services in a single cycle.

In a different aspect, servicing the channel in the fixed periodic cycle includes other substeps. Step 1002c counts the number of clock signals. Step 1002d compares the clock signal count to a threshold value, and Step 1002e automatically services a channel in response to the clock signal count reaching the threshold value.

A timer system and method have been presented for servicing timer channels in a fixed periodic cycle, without the need for microprocessor assistance. Some circuit details and uses for the timer functions have been presented to illustrate the invention. However, the invention is not limited to merely these examples. Other variations and embodiments of the invention will occur to those skilled in the art.

We claim:

1. In a timer for controlling events, a method for periodically servicing a channel, the method comprising:
servicing a channel in a fixed periodic cycle;
reading a first control word loaded in the channel to determine a timer operation;
supplying a time base counter value;
managing a first data word in the channel in response to the determined operation as follows:
detecting a signal on an external interface;
loading the counter value into the channel, in response to the detected signal; and,
wherein servicing the channel in a fixed periodic cycle includes storing the loaded value as the first data word in internal random access memory (RAM).

2. The method of claim 1 wherein servicing the channel in a fixed periodic cycle includes loading the first control word and the first data word into the channel from RAM;
wherein managing the data word in the channel includes:
comparing the first data word to the counter value; and,
in response to a match, supplying an output signal to an external interface.

3. The method of claim 1 wherein storing the loaded value as the first data word in RAM includes storing the first data word and the first control word in sequential addresses in RAM.

4. The method of claim 2 further comprising:
in a subsequent cycle, accessing the RAM;
loading a second control word and a corresponding second data word into the channel;
reading the second control word to determine an operation; and,
managing the second data word in response to the determined operation.

5. The method of claim 4 wherein loading the second control and second data word into the channel includes loading the second control and second data words into a single register.

6. The method of claim 5 wherein accessing RAM includes locating the second control word and second data word in sequential addresses.

7. The method of claim 1 further comprising:
supplying a clock signal with a fixed period; and,
wherein servicing the channel in a fixed periodic cycle includes:
establishing a cycle having a first number of clock signals; and,
servicing the channel for a second number of clock signals each cycle.

8. The method of claim 7 wherein servicing the channel in a fixed periodic cycle includes:
interacting with a plurality of channels in a single cycle; and,
serially servicing each channel within the cycle.

9. The method of claim 7 wherein servicing the channel in the fixed periodic cycle includes:
counting the number of clock signals;
comparing the clock signal count to a threshold value; and,
automatically servicing a channel in response to the clock signal count reaching the threshold value.

10. The method of claim 1 wherein reading the first control word loaded in the channel to determine an operation includes determining an operation selected from a group consisting of input capture, output compare, count up, count down, and pulse width modulation (PWM).

11. A timer for controlling events with periodic channel service, the timer comprising:
a channel for monitoring a loaded control word and a loaded data word, the channel reading a first control word to determine an operation, and managing a first data word in response to the determined operation;
a timer service engine (TSE) having an interface for servicing the channel with control words and corresponding data words in a fixed periodic cycle;
an internal random access memory (RAM) having an interface connected to the TSE;
an external interface pin connected to the channel;
a time base counter having an interface connected to the channel to supply a counter value;
wherein the channel detects a signal on the external interface pin and loads the counter value into the channel in response to the detected signal; and,
wherein the TSE stores the loaded value from the channel into RAM as the first data word.

12. The timer of claim 11 wherein the TSE accesses the first control word and first data word from RAM, and loads the words into the channel;
wherein the channel compares the first data word to the counter value, and in response to a match, supplies an output signal to the external interface pin.

13. The timer of claim 11 wherein the TSE stores the first data word and the first control word as sequential addresses in RAM.

14. The timer of claim 12 wherein the channel completes the management of the first data word;
wherein the TSE accesses the RAM is a subsequent cycle, loads a second control word and a second data word into the channel; and,
wherein the channel monitors the second control word and second data word.

15. The timer of claim 14 wherein the channel consists of a single register.

16. The timer of claim 15 wherein the TSE accesses RAM, locates the second control word and second data word in sequential addresses, and loads the second control word and second data word into the channel.

17. The timer of claim 11 further comprising:
a clock having an interface to supply clock signals with a fixed period; and,
wherein the TSE has an interface to receive the clock signal, and wherein the TSE establishing a cycle having a first number of clock signals and services the channel for a second number of clock signals each cycle.

18. The timer of claim 17 further comprising:
a plurality of channels, each with loaded control and data words and each having an interface connected to the TSE;
wherein the TSE serially services each channel within a single cycle; and,
wherein each channel continuously manages data words, independent of the cycle established by the TSE.

19. The timer of claim 17 wherein the TSE counts the number of clock signals, compares the clock signal count to a threshold value, and automatically services a channel in response to the clock signal count reaching the threshold value.

20. The timer of claim 11 wherein the channel reads the first control word to determine an operation selected from a group consisting of input capture, output compare, count up, count down, and pulse width modulation (PWM).

* * * * *

UNITED STATES PATENT AND TRADEMARK OFFICE
CERTIFICATE OF CORRECTION

PATENT NO. : 7,475,237 B2 Page 1 of 1
APPLICATION NO. : 11/402750
DATED : January 6, 2009
INVENTOR(S) : Wilkie et al.

It is certified that error appears in the above-identified patent and that said Letters Patent is hereby corrected as shown below:

In col. 9, line 5, Claim 6 Delete "claim 5" and insert -- claim 4 --.

Signed and Sealed this

Seventeenth Day of March, 2009

JOHN DOLL
*Acting Director of the United States Patent and Trademark Office*